N. A. LANGLET & E. L. RINMAN.
PROCESS OF PRODUCING PULVERULENT AND EASILY WASHABLE HYDRATE OF ALUMINIUM.
APPLICATION FILED MAY 29, 1908.
1,015,499.
Patented Jan. 23, 1912.
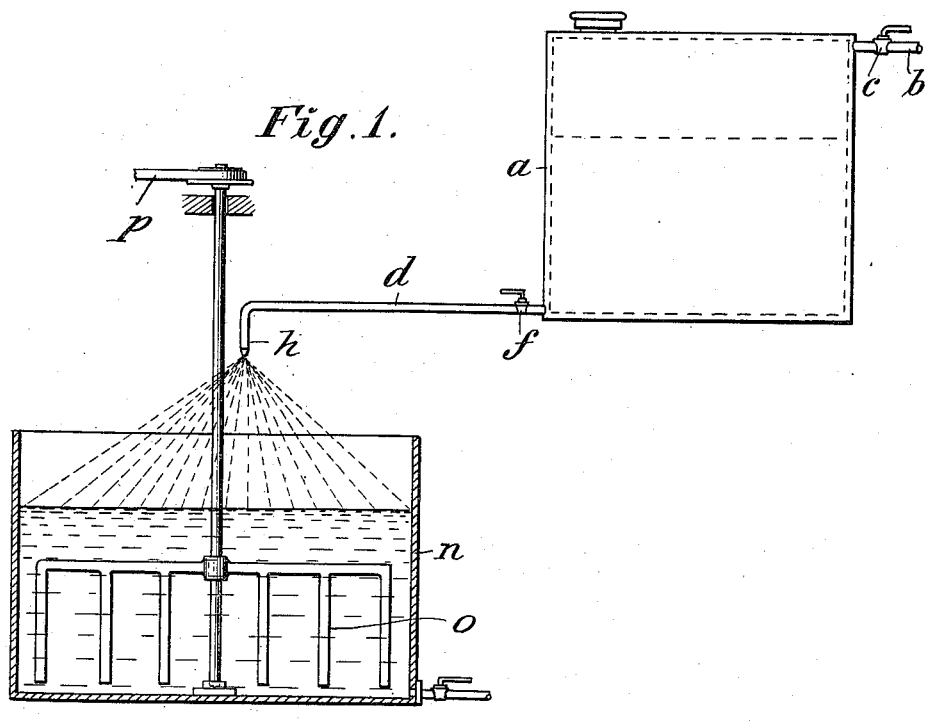
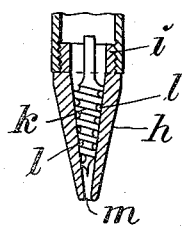
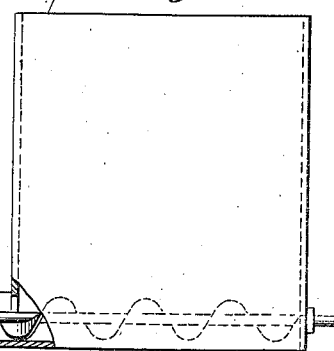

UNITED STATES PATENT OFFICE.

NILS ABRAHAM LANGLET, OF GOTTENBORG, AND ERIK LUDVIG RINMAN, OF UPPSALA, SWEDEN.

PROCESS OF PRODUCING PULVERULENT AND EASILY-WASHABLE HYDRATES OF ALUMINIUM.

1,015,499.  Specification of Letters Patent.  Patented Jan. 23, 1912.

Application filed May 29, 1908. Serial No. 435,652.

*To all whom it may concern:*

Be it known that we, NILS ABRAHAM LANGLET, a subject of the King of Sweden, and resident of Gottenborg, in the Kingdom of Sweden, and ERIK LUDVIG RINMAN, a subject of the King of Sweden, and resident of Uppsala, in the Kingdom of Sweden, have invented new and useful Improvements in Processes of Producing Pulverulent and Easily-Washable Hydrate of Aluminium, of which the following is a specification, reference being had to the drawing accompanying and forming a part hereof.

It is well known that the hydrate of aluminium obtained if a water solution of an aluminium salt is treated with an alkali, for instance if a solution of aluminium sulfate is treated with ammonia, is colloidal and practically impossible to filter and wash.

The object of the invention is to make it possible to obtain a pulverulent precipitate which may be easily filtered and easily washed.

The invention consists, chiefly, in introducing the aluminium salt from which the precipitate is to be obtained, in a finely divided state, into the precipitating alkali. By proceeding in such manner, each of the small particles of the aluminium salt is immediately covered by a thin film or pellicle of the precipitated substance, by which the aluminium salt is prevented from diffusing into the solution. On account thereof, hydrate of aluminium is obtained as a precipitate consisting of small grains of about the same size as that of the particles of the aluminium salt introduced into the precipitant.

The aluminium salt may be supplied to the precipitant either in a solid state or in the form of a solution. In the former case, the aluminium salt is supplied in the form of a fine powder obtained by pulverization or by disturbed crystallization, the latter being preferable, since in such case a more homogenous powder is generally obtained. If, on the other hand, the aluminium salt is supplied in the form of a solution, said solution is preferably sprinkled or sprayed by an atomizer, such as a Körting's or a centrifugal sprayer, into the precipitant. The precipitant may be a gas, for instance ammonia, or a liquid, such as ammonia water, or both a gas and a liquid. If the precipitant is a gas, the precipitate obtained should first be washed with a water solution of the precipitant, in order that the washing shall be as effective as possible. It has, however, been found inconvenient to treat an aluminium salt with a gas, for instance ammonia, solely, since in practice this cannot be made without the solution becoming heated, which prevents a complete removal of the mother-liquor by washing on account of the mother-liquor being incased due to the hydrate of aluminium being transformed by heating into a more insoluble form. A better result is obtained if an alkaline liquid is used as a precipitant, or if a superficial precipitation is effected by a gas and the precipitation is thereupon completed by a precipitant in solution. The latter is generally the case if the aluminium salt is introduced into ammonia water, in which case the finely divided aluminium salt has to pass a more or less ammonical atmosphere before it reaches the solution. By this means each particle of the aluminium salt is coated by a thin layer of hydrate of aluminium without the precipitation being sufficient to cause any considerable heating. The precipitation is thereupon completed in the ammonia water without any heating taking place. On account thereof the precipitate obtained may be easily freed from all traces of ammonium salts by washing with dilute ammonia water. The last remains of ammonia are preferably driven out by heating the precipitate.

In order that our invention may be more easily understood, we will now describe two examples of carrying the process into effect, reference being had to the drawing, in which—

Figure 1 is a diagram showing a system of apparatus for introducing a solution of an aluminium salt, such as aluminium sulfate, into a liquid precipitant. Fig. 2 shows the wellknown spreader called Körting's sprayer. Fig. 3 shows a device for introducing an aluminium salt in a powdered state, such as powdered alum, into the precipitant.

Referring first to Fig. 1, the solution of aluminium sulfate is held in a receptacle *a* under pressure supplied through a pipe or tube *b* suitably provided with a cock *c*. The solution is withdrawn through a tube *d* provided with a cock $f$. The spreader $h$ is secured to the end of the tube $d$, suitably by inscrewing the part $i$ (Fig. 2) thereof into the said tube. It may consist of the well-known device comprising a hollow cone $h$ inclosing a plug $k$ fitting tightly to the interior of the cone and having a spiral groove $l$ through which the liquid under pressure is pressed in order to thereby obtain a rapidly rotating movement and be sprayed, by the centrifugal force, when issuing through the hole $m$ at the apex of the cone. The rain or spray or liquid thus obtained drops into a receptacle $n$ (Fig. 1) containing the liquid precipitant (ammonia water). The agitation of the contents of the said receptacle is effected by a stirring device $o$ driven by belting $p$ or otherwise. The precipitate obtained is separated by filtration, preferably with the aid of vacuum (so-called nutsch-filtration), and continuously washed with dilute ammonia water at usual temperature. After washing, the remaining water is pressed away and the ammonia is driven off by heating. If the precipitant is a gas or a combination of a gas and a liquid, it may be necessary to replace the receptacle $n$ by an air tight chamber. This is especially necessary if the precipitant consists of a light gas.

As a second example, pulverulent and easily washable hydrate of aluminium may be produced from an ammonium-alum-powder by precipitation with ammonia. The alum-powder, preferably obtained by disturbed crystallization, is held in a receptacle $q$ (Fig. 3), from which it is introduced by a conveyer screw $r$ into a 25 per cent. water solution of ammonia. The quantity of alum supplied is somewhat less than the equivalent quantity of ammonia so that the solution will always be alkaline. The pulpy mass obtained should stand for some hours with or without agitating so as to obtain a complete neutralization. The mass is thereupon treated in the same manner as according to the first example for separating the mother-liquor from the hydrate of aluminium obtained.

We claim:

1. The process of producing pulverulent and easily washable hydrate of aluminium which consists in introducing an aluminium salt in a finely divided state into a precipitating alkali, substantially as and for the purpose set forth.

2. The process of producing pulverulent and easily washable hydrate of aluminium which consists in introducing an alum-powder into ammonia water, substantially as and for the purpose set forth.

3. The process of producing pulverulent and easily washable hydrate of aluminium which consists in introducing an alum-powder into ammonia water of a concentration of about 25 per cent., and thereafter washing the pulverulent precipitate with dilute ammonia water at ordinary temperature.

In testimony whereof we have signed our names to this specification in the presence of two subscribing witnesses.

NILS ABRAHAM LANGLET.
ERIK LUDVIG RINMAN.

Witnesses:
   AUG. SÖRENSEN,
   KARL RUNESKOG.